United States Patent
Lee et al.

(10) Patent No.: US 6,806,809 B2
(45) Date of Patent: Oct. 19, 2004

(54) TRAILER TONGUE LENGTH ESTIMATION USING A HITCH ANGLE SENSOR

(75) Inventors: Yong Han Lee, Troy, MI (US); Weiwen Deng, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 7 days.

(21) Appl. No.: 10/336,120

(22) Filed: Jan. 3, 2003

(65) Prior Publication Data

US 2004/0130441 A1 Jul. 8, 2004

(51) Int. Cl.[7] .............................................. G08B 21/00
(52) U.S. Cl. ....................... 340/431; 340/671; 340/684; 340/691.5; 340/691.8; 340/435; 280/419; 280/432; 280/428; 701/36; 701/41
(58) Field of Search ................................ 340/431, 671, 340/684, 691.5, 691.8, 435; 280/419, 432, 428; 701/36, 41

(56) References Cited

U.S. PATENT DOCUMENTS

| | | | | |
|---|---|---|---|---|
| 5,247,442 A | * | 9/1993 | Kendall ........................ 701/41 |
| 5,523,947 A | * | 6/1996 | Breen ........................... 701/36 |
| 5,579,228 A | * | 11/1996 | Kimbrough et al. ........... 701/41 |
| 6,292,094 B1 | | 9/2001 | Deng et al. .................. 340/431 |
| 6,655,710 B2 | * | 12/2003 | Lindell et al. ............... 280/419 |
| 6,668,225 B2 | * | 12/2003 | Oh et al. ....................... 701/70 |

* cited by examiner

Primary Examiner—Daniel J. Wu
Assistant Examiner—Tai T. Nguyen
(74) Attorney, Agent, or Firm—Kathryn A. Marra

(57) ABSTRACT

A control system for estimating the tongue length of a trailer being towed by a vehicle in connection with a front wheel steering with or without a coordinated rear wheel steering associated with the vehicle. The control signal system employs an algorithm that calculates an estimated hitch angle between the vehicle and the trailer based on an estimated tongue length, a front wheel steering angle, a rear wheel steering angle, a measured hitch angle, vehicle speed and vehicle yaw rate. The estimated hitch angle is compared to the measured hitch angle to generate a hitch angle error that is converted to a tongue length error. The tongue length error is compared to the estimated tongue length to become a corrected estimated tongue length for a next computation period. After a few seconds of processing, the corrected estimated tongue length will be the actual tongue length of the trailer.

21 Claims, 2 Drawing Sheets

TRAILER TONGUE LENGTH ESTIMATION USING A HITCH ANGLE SENSOR

BACKGROUND OF THE INVENTION

1. Field of the Invention

This invention relates generally to a control system for estimating the tongue length of a trailer being towed by a vehicle and, more particularly, to a control system for estimating the tongue length of a trailer being towed by a vehicle using a hitch angle between the trailer and the vehicle, where the vehicle includes driver operated front wheel steering with or without computer controlled rear wheel steering.

2. Discussion of the Related Art

Automotive vehicles that employ coordinated front wheel steering and rear wheel steering systems are known in the art. Typically, in such coordinated vehicle wheel steering systems, the driver controls the steering of the vehicle's front wheels and a computer-based on-board steering controller controls the steering of the vehicle's rear wheels in response thereto. In one example, the computer controlled rear wheel steering system employs an electric motor driven rack and pinion rear wheel steering actuator.

Known coordinated front and rear wheel steering systems typically provide both "in-phase" rear wheel steering and "out-of-phase" rear wheel steering. In-phase rear wheel steering occurs when the rear wheels are turned at an angle directed to the same side of a longitudinal axis of the vehicle as the front wheels. Out-of-phase rear wheel steering occurs when the rear wheels are turned at an angle directed to the opposite side of the longitudinal axis of the vehicle as the front wheels. The on-board steering controller determines the rear wheel steering angle as a function of vehicle speed and the operator actuated front wheel steering. The system, in general, will provide out-of-phase rear wheel steering at low vehicle speeds to reduce the turning radius of the vehicle, and in-phase rear wheel steering at high vehicle speeds to increase directional stability.

As is well understood in the art, it is sometimes a difficult and complicated task to effectively back up a vehicle that is pulling a trailer. It is heretofore known in the art to employ the coordinated front and rear wheel steering system discussed above to assist a driver operating a vehicle pulling a trailer. Particularly, U.S. Pat. No. 6,292,094, issued Sep. 18, 2001 to Deng et al., assigned to the assignee of this application, and herein incorporated by reference, discloses a vehicle-trailer backing-up control system in connection with a computer controlled rear wheel steering system. The '094 patent employs an algorithm that uses front wheel angle, vehicle speed, vehicle yaw rate and hitch angle to control the rear wheel steering angle to assist the operator in backing up the vehicle with the trailer.

The vehicle-trailer backing-up control system disclosed in the '094 patent has been effective in assisting the vehicle operator when backing up a trailer. However, because trailers come in a variety of different lengths the performance of the backing-up control system can be improved by providing an input to the system that gives an estimation of the tongue length of the trailer. The algorithm in the '094 patent uses a constant tongue length for trailers of all lengths.

SUMMARY OF THE INVENTION

In accordance with the teachings of the present invention, a control system is disclosed for estimating the tongue length of a trailer being towed by a vehicle in connection with a coordinated front and rear wheel steering system associated with the vehicle. The control system employs an algorithm that calculates an estimated hitch angle between the vehicle and the trailer based on an initial tongue length estimation, a front wheel steering angle, a rear wheel steering angle, a measured hitch angle, vehicle speed and vehicle yaw rate. The estimated hitch angle is compared to the measured hitch angle to generate a hitch angle error signal that is converted to a tongue length error signal by a PID controller. The tongue length error signal is subtracted from the estimated tongue length to give a corrected estimated tongue length for a next computation period. After a few seconds of processing, the hitch angle error signal will be nearly zero and the tongue length error signal will be nearly zero, and thus the corrected tongue length will be the actual tongue length of the trailer.

Additional objects, advantages and features of the present invention will become apparent from the following description and appended claims, taken in conjunction with the accompanying drawings.

DETAILED DESCRIPTION OF THE INVENTION

The following discussion of the invention directed to a control system for estimating the tongue length of a trailer being towed by a vehicle employing a coordinated front and rear wheel steering system is merely exemplary in nature, and is in no way intended to limit the invention or its applications or uses.

Figure 1:
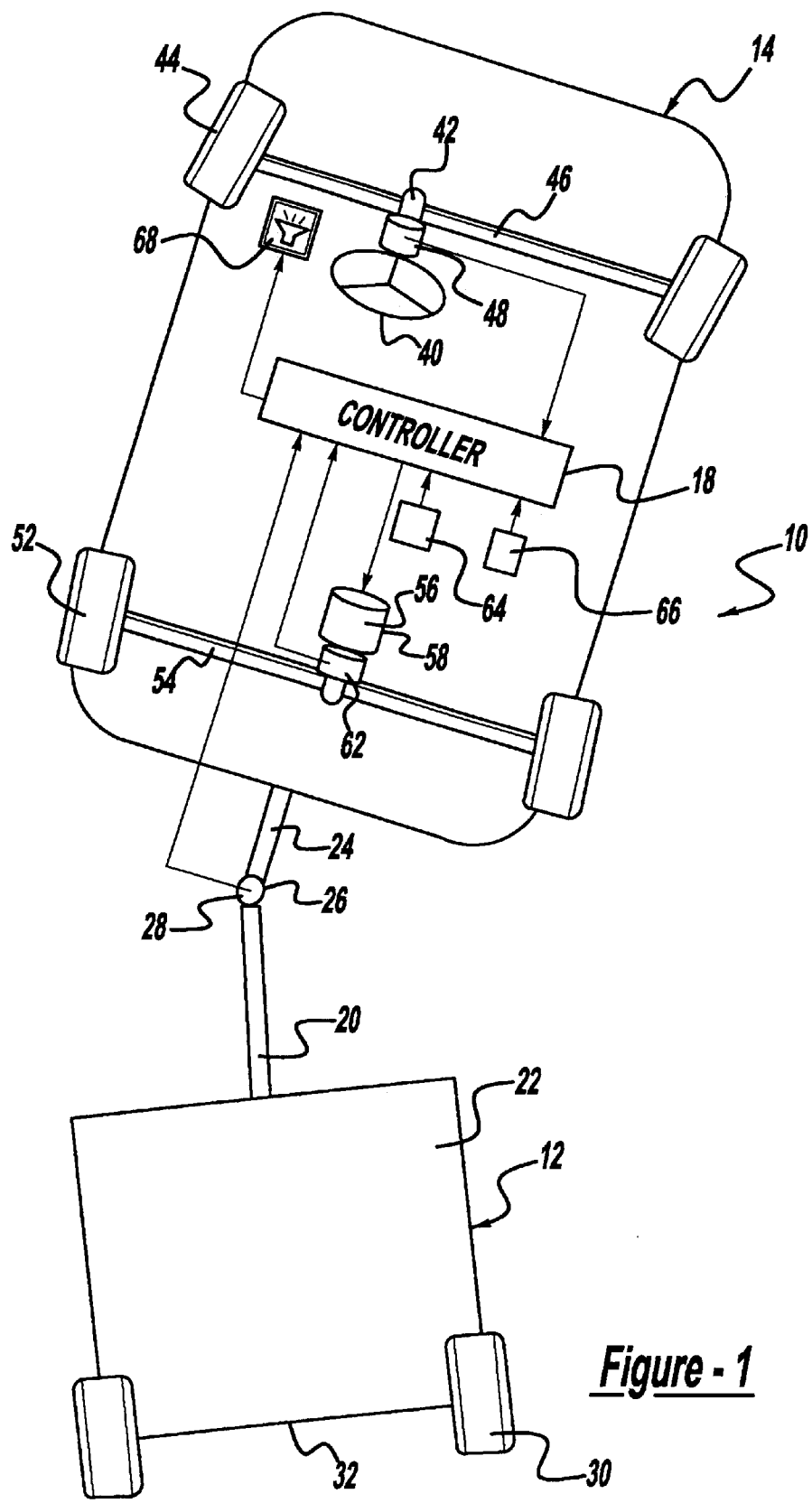
FIG. 1 is a plan view of a vehicle towing a trailer, where the vehicle includes a coordinated front and rear wheel steering system that provides an estimation of the tongue length of the trailer, according to an embodiment of the present invention.

FIG. 1 is a plan view of a control system 10 that includes a process for estimating a tongue length (TL) of a trailer 12 being towed by a vehicle 14. The system 10 is an improvement of the backing-up control system disclosed in the '094 patent that uses the coordinated front and rear wheel steering system to provide an intelligent vehicle-trailer backing-up system. In this regard, the system 10 includes the same type of a controller 18 as does the control system in the '094 patent. Further, the system 10 includes various other vehicle sensors used in the control system disclosed in the '094 patent, as will be apparent from the discussion below. The various vehicle sensors discussed below that are used in the control system of the '094 patent can be any sensor suitable for the purposes discussed herein, and need not be specifically limited to those types of sensors disclosed in the '094 patent. In other embodiments, the tongue length estimation process of the invention can be used in vehicles that do not have assisted rear wheel steering The trailer 12 includes a trailer hitch post 20, a trailer bed 22 and trailer wheels 30 rotatably mounted to a trailer axle 32. In other embodiments, the trailer may include more than one axle each including trailer wheels. The center of the turning radius for those trailers may be between the axles. The vehicle 14 includes a vehicle hitch post 24 having a hitch 26 that couples the hitch post 24 to the hitch post 20 in any known manner that allows the trailer 12 to be towed by the vehicle 14. The hitch 26 includes a hitch angle sensor 28 that measures the angle between a line running through the length of the vehicle hitch post 24 and a line running through the length of the trailer hitch post 20. The sensor 28 provides a measured hitch angle (HA) signal indicative of the hitch angle to the controller 18. The hitch angle sensor 28 can be any sensor that is suitable for the purposes described herein. As defined herein, the tongue length of the trailer 12 is the distance from the pivot location at the hitch 26 to the rotating center or turning radius of the trailer 12. When the vehicle 14 and the trailer 12 are backing up at a low speed and there is no side slip at the wheels 30, the tongue length of the trailer 12 is the distance from the hitch 26 to the center of the trailer axle 32.

The vehicle 14 includes a steering wheel 40 mounted to a steering column 42 that allows a vehicle operator to steer front wheels 44 of the vehicle 14 in unison through a steering linkage and front wheel axle 46. A steering wheel angle sensor 48 is mounted to the steering column 42 to provide a front wheel angle (FWA) signal indicative of the steering direction of the wheels 44. The maximum angular movement for a particular vehicle's front wheels is generally fixed, and may be, for example, about +33° to the left or −33° to the right. The FWA signal from the steering wheel angle sensor 48 is provided to the controller 18.

The vehicle 14 also includes rear wheels 52 mounted to a rear wheel axle 54. The rear wheels 52 are turned in unison by an electric motor 56 in connection with a rack and pinion steering mechanism 58 mounted to the axle 54. A rear wheel angle sensor 62 is mounted in combination with the rack and pinion steering mechanism 58, and provides a rear wheel angle (RWA) signal to the controller 18 indicative of the angle of the rear wheels 52.

The system 10 includes a vehicle speed sensor 64 that measures the speed of the vehicle 14 and provides a vehicle speed (Vx) signal to the controller 18. The system 10 further includes a vehicle yaw rate sensor 66 that measures the yaw rate of the vehicle 14 and provides a vehicle yaw rate (Veh Yr) signal to the controller 18. The speed sensor 64 and the yaw rate sensor 66 can be any sensor suitable for the purposes described herein. The controller 18 provides driver signals and commands to a driver advisor 68, such as a suitable display, indicative of the operation of the system 10. For example, as will become apparent from the discussion below, the vehicle needs to be turning for some period of time to provide the necessary signals to calculate the estimated tongue length of the trailer 12. The driver advisor 68 can be used to instruct the driver to make the necessary turns when the trailer 12 is first connected to the vehicle 14, and tell the driver that the estimated tongue length of the trailer 12 has been calculated thereafter.

Figure 2:
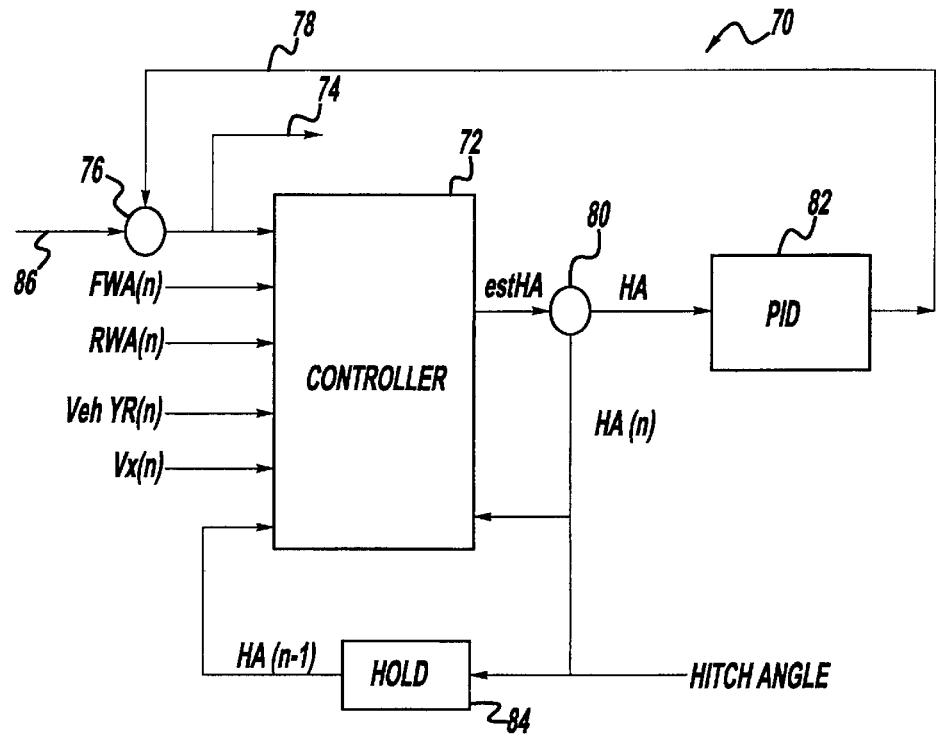
FIG. 2 is a schematic block diagram of a control system employing an algorithm for estimating the tongue length of the trailer shown in FIG. 1, according to an embodiment of the present invention.

According to the invention, the vehicle speed signal, the front wheel angle signal, the rear wheel angle signal, the measured hitch angle signal and the vehicle yaw rate signal are used to compute an estimated trailer tongue length. FIG. 2 is a block diagram of a trailer tongue length estimation system 70 for this purpose to be used in connection with the system 10. The tongue length estimation system 70 would be part of the controller 18. The system 70 includes a controller 72 that receives the signals mentioned above and a corrected estimated trailer tongue length to compute an estimated hitch angle (est HA). A reasonable initial tongue length estimation signal is applied to a comparator, such as a summer 76, on line 86. A tongue length error signal on line 78, described below, is subtracted from the tongue length estimation signal in the summer 76 to provide the corrected tongue length estimation signal that is applied to the controller 72.

When the tongue length estimation process is first activated, the tongue length error signal is zero, and thus the initial tongue length estimation signal is applied to the controller 72 as the corrected tongue length estimation signal. For subsequent calculation periods, the corrected tongue length estimation signal will be closer to the actual trailer tongue length than the initial tongue length estimation signal. After a certain number of calculation periods the corrected tongue length is close to the actual tongue length, which is provided on output line 74.

Each of the vehicle speed signal, the front wheel angle signal, the rear wheel angle signal, the hitch angle signal and the vehicle yaw rate signal are applied to the controller 72 at computation period n. The measured hitch angle signal is applied to a zero order hold 84 that holds the signal one computation period. Therefore, the algorithm can use the measured hitch angle for the current calculation period and the measured hitch angle for the previous calculation period to provide a more accurate estimated hitch angle signal.

From the initial tongue length estimation and the input signals discussed above, at time t=nΔt, the controller 72 computes the estimated hitch angle. The estimated hitch angle signal is compared with the measured hitch angle signal in a comparator, for example, summer 80. The difference between the measured hitch angle and the computed estimated hitch angle is applied as a hitch angle error signal to a proportional-integral-differential (PID) controller 82. The PID controller 82 converts the hitch angle error signal to the tongue length error signal that is provided on the line 78. The PID controller 82 employs any suitable PID algorithms to adjust the sensitivity of the hitch angle error signal to provide a proportional tongue length error signal in response thereto. Each of the parameters in the PID algorithm is assigned a particular gain to provide the desired conversion. If the error conditions of the hitch angle estimation from the controller 72 are within predetermined tolerances, then the estimated tongue length signal on the output line 74 is close to the actual tongue length of the trailer 12.

Figure 3:
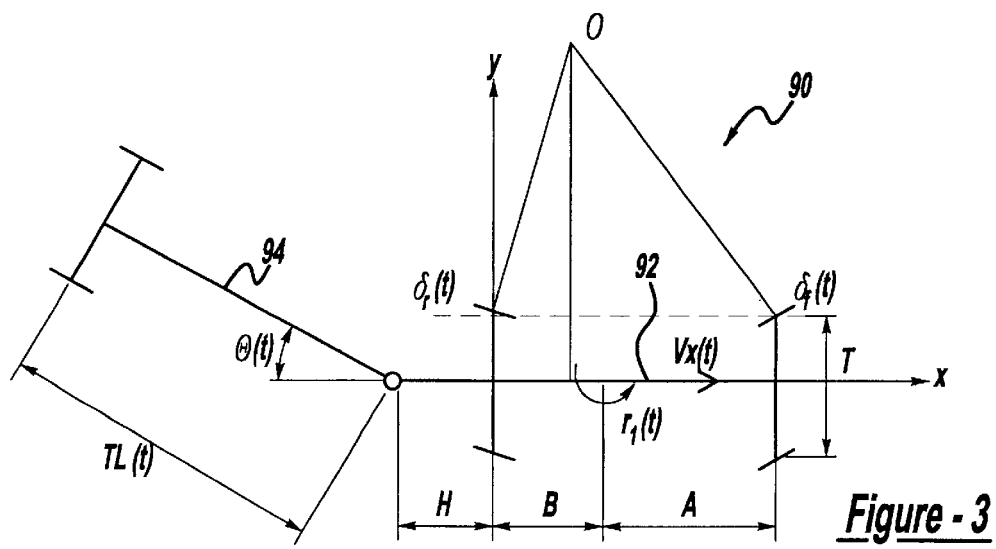
FIG. 3 is a kinematics model for a vehicle-trailer system for the algorithm of the control system in FIG. 2.

The process of computing the estimated hitch angle signal in the controller 72 will be discussed with reference to the kinematics model of a vehicle-trailer system 90, as shown in FIG. 3, where reference number 92 represents the vehicle 14 and reference number 94 represents the trailer 12. At time t, the input signals of the vehicle speed along the x axis ($V_x(t)$), the front wheel angle ($\delta_f(t)$), the rear wheel angle ($\delta_r(t)$), the vehicle yaw rate ($r_1(t)$), and the hitch angle measurement ($\theta(t)$) are provided to the controller 72. The lateral velocity component at the hitch 26 is computed as:

$$V_{yh}(t) = -\left(H + B + \frac{A\tan(\delta_r(t)) - B\tan(\delta_f(t))}{\tan(\delta_r(t)) + \tan(\delta_f(t))}\right) * r_1(t) \quad (1)$$

where A is the distance from the center of the front axle 44 to the center of gravity point of the vehicle 14, B is the distance from the center of gravity point to the center of the rear axle 54, and H is the distance from the center of the rear axle 54 to the hitch 26.

Next, the lateral velocity of the trailer 12 at the hitch 26 is determined by:

$$U_{yh}(t) = V_{xh}(t) * \sin(\theta(t)) + V_{yh}(t) * \cos(\theta(t)) \quad (2)$$

where $$V_{xh}(t) = V_x(t) \quad (3)$$

Since the hitch angle rate is the difference between the vehicle and trailer yaw rate, the hitch angle rate is computed using the current tongue length estimation as:

$$\dot{\theta}(t) = r_1(t) - \frac{U_{yh}(t)}{TL(t - \Delta t)} \quad (4)$$

where TL(t−Δt) is the estimated tongue length at time t−Δt. The estimation of the hitch angle at time t can be obtained by:

$$\hat{\theta}(t) = \theta(t - \Delta t) + \dot{\theta}(t) * \Delta t \quad (5)$$

If the hitch angle estimation $\hat{\theta}(t)$ is compared with the actual measured hitch angle θ(t), the difference is:

$$\Delta\theta(t) = \theta(t) - \hat{\theta}(t) \quad (6)$$

$$\Delta TL(t) = K_p * \Delta\theta(t) + K_i \int \Delta\theta(t) dt + K_d \frac{d(\Delta\theta(t))}{dt} \quad (7)$$

$$TL(t) = TL(t - \Delta t) + \Delta TL(t) \quad (8)$$

In one embodiment, the PID control gains ($K_p$, $K_i$, $K_d$) are assigned in the PID controller 82 using a PID gain assignment rule discussed below. If |Δθ(t)|>2.86°, then the PID gains are $K_p$=100.0, $K_i$=2.0 and $K_d$=1.0. Otherwise, $K_p$=20.0, $K_i$=1.0, and $K_d$=0.0. If $U_{yh}$<0.0 m/sec, then the sign of the PID gains are reversed. However, this is by way of a non-limiting example in that other PID control gains for other applications can be employed within the scope of the present invention.

In order to start the tongue length estimation process, certain of the input parameters should be over a certain limit. This is because the system 10 will not receive the appropriate signals if the vehicle 14 and the trailer 12 are moving along a straight path. In other words, in order to estimate the tongue length, the vehicle 14 and the trailer 12 should move on a circular path to produce the vehicle/trailer yaw rate, the hitch angle and the other parameters. In one embodiment, the initial conditions are:

$$|V_x(t)| > 1.0 (kph),$$

$$|r_1(t)| > 0.1 \ (deg/sec), \quad (9)$$

and |θ(t)|>5.0 (deg).

Although it is observed that the best maneuver to produce accurate tongue length estimation is a step steer forward or backwards, other turning or sinusoidal steering maneuvers can be used for the tongue length estimation process. There is also a stop condition for the estimation process. When the hitch angle estimation error is within a reasonable range for a certain period, the estimated tongue length is accepted as the actual tongue length. The stop conditions are dependent upon the noise characteristics of the input data.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for estimating a tongue length of a trailer being towed by a vehicle, said vehicle including a pair of front wheels and a pair of rear wheels, said system comprising:
   a front wheel angle sensor for providing a front wheel angle signal indicative of the angle of the front wheels of the vehicle;
   a vehicle speed sensor for providing a vehicle speed signal indicative of the speed of the vehicle;
   a vehicle yaw rate sensor for providing a yaw rate signal indicative of the yaw rate of the vehicle;
   a hitch angle sensor for providing a measured hitch angle signal indicative of a hitch angle between the vehicle and the trailer; and
   a tongue length estimation controller for computing the estimate of the tongue length, said estimation controller computing the estimate of the tongue length based on the front wheel angle signal, the vehicle yaw rate signal, the vehicle speed signal and the measured hitch angle signal.

2. The system according to claim 1 wherein the estimation controller computes an estimated hitch angle signal and compares th estimated hitch angle signal to the measured hitch angle signal to generate a hitch angle error signal therefrom.

3. The system according to claim 2 wherein the tongue length estimation controller converts the hitch angle error signal to a tongue length error signal.

4. The system according to claim 3 wherein the estimation controller includes a proportional-integral-differential controller that is responsive to the hitch angle error signal, said proportional-integral-differential controller converting the hitch angle error signal to the tongue length error signal.

5. The system according to claim 3 where n the estimation controller includes a comparator for comparing the tongue length error signal to an initial tongue length estimation signal to generate a corrected tongue length stimulation signal.

6. The system according to claim 5 wherein the corrected tongue length estimation signal becomes the estimate of the tongue length after a predetermined number of calculation periods.

7. The system according to claim 1 further comprising a rear wheel angle sensor for providing a rear wheel angle signal indicative of the angle of the rear wheels of the vehicle, said tongue length estimation controller computing the estimate of the tongue length of the trailer based on all of the front wheel angle signal, the rear wheel angle signal, the vehicle yaw rate signal, the vehicle speed signal and the measured hitch angle signal.

8. The system according to claim 7 wherein the rear wheels of the vehicle are automatically controlled by a rear wheel controller in the vehicle.

9. The system according to claim 1 wherein the tongue length estimation controller does not compute the estimate of the tongue length until certain initial conditions are met, said initial conditions including vehicle speed vehicle yaw rate and the hitch angle.

10. The system according to claim 9 wherein the initial conditions include a vehicle speed greater than 1 kilometer per hour, a vehicle yaw rate greater than 0.1 degrees per second and a hitch angle greater than 5°.

11. The system according to claim 1 wherein the system is used in connection with a coordinated front and rear wheel steering system.

12. A system for estimating a tongue length of a trailer being towed by a vehicle, said vehicle including a pair of front wheels and a pair of rear wheels, where the front wheels are steered by an operator a the rear wheels are automatically steered by an on-board steering controller, said control system comprising:

a front wheel angle sensor for providing a front w eel angle signal indicative of the angle of the front wheels of the vehicle;

a rear wheel angle sensor for providing a rear w eel angle signal indicative of the angle of the rear wheels of the vehicle;

a vehicle speed sensor for providing a vehicle speed signal indicative of the speed of the vehicle;

a vehicle yaw rate sensor for providing a yaw rate signal indicative of the yaw rate of the vehicle;

a hitch angle sensor for providing a measured hitch angle signal indicative of a hitch angle between the vehicle and the trailer; and a tongue length estimation controller for computing th estimate of the tongue length of the trailer, said estimation controller computing a estimated hitch angle signal based on the frontwheel angle signal, the rear-wheel angle signal, the vehicle yaw rate signal, the vehicle speed signal and the measured hitch angle signal, said tongue length estimation controller including a first comparator f r comparing the estimated hitch angle signal to the measured hitch angle signal to generate a hitch angle error signal representative of the difference between the estimated hitch angle and the measured hitch angle, said estimation controller further including a proportional-integral-differential controller that is responsive to the itch angle error signal, said proportional-integral-differential controller converting the hitch angle error signal to a tongue length error signal, said estimation controller further including a second comparator for comparing the tongue length error signal to an initial tongue length estimation signal to provide a corrected tongue length estimation signal, wherein the corrected tongue length estimation signal becomes the estimated tongue length after a predetermined number of calculation periods.

13. The system according to claim 12 wherein the tongue length estimation controller does not compute the estimate of the tongue length until certain initial conditions are met, said initial conditions including vehicle speed, vehicle yaw rate and the hitch angle.

14. The system according to claim 13 wherein the initial conditions include a vehicle speed greater than 1 kilometer per hour, vehicle yaw rate greater than 0.1 degrees per second and a hitch angle greater than 50°.

15. A system comprising:

a vehicle including a pair of front wheels and a pair of ear wheels, said vehicle further including a vehicle hitch post;

a trailer including trailer wheels, said trailer further including a trailer hitch post;

a hitch coupling the vehicle hitch post to the trailer hitch post;

a hitch sensor for measuring a hitch angle between the vehicle hitch post and the trailer hitch post, said hitch sensor providing a hitch angle signal indicative of the measured hitch angle; and a controller, said controller computing a tongue length of the trailer based on the hitch angle signals wherein the controller compares the hitch angle signal to an estimated hitch angle, said estimated hitch angle being computed by an algorithm from inputs including an angle of the vehicle's front wheels, an angle of he vehicle's rear wheels, a yaw rate of the vehicle, a speed of the vehicle and the measured hitch angle.

16. The system according to claim 15 wherein the system is used in connection with a coordinated front and rear wheel steering system.

17. A method of estimating a tongue length of a trailer being towed by a vehicle, comprising:

determining the angle of front wheels of the vehicle;

determining the speed of the vehicle;

determining the yaw rate of the vehicle;

determining a hitch angle between the vehicle and the trailer; and computing the estimate of the tongue length of the trailer based on the front wheel angle, the vehicle yaw rate, the vehicle speed and the hitch angle.

18. The method according to claim 17 further comprising determining the angle of rear wheels of the vehicle, wherein computing the tongue length includes computing the estimate of the tongue length based on the front wheel angle, the rear wheel angle, the vehicle yaw rate, the vehicle speed and the hitch angle.

19. The method according to claim 17, Wherein computing the estimate of the tongue length includes computing an estimated hitch angle and comparing the estimated hitch angle to the measured hitch angle to generate a hitch angle error signal.

20. The method according to claim 19 wherein computing the estimate of the tongue length includes converting the hitch angle error signal to a tongue length error signal.

21. The method according to claim 20 where in computing the estimate of the tongue length includes comparing the tongue length error signal to an initial tongue length estimation signal to generate a corrected tongue length estimation.

* * * * *